United States Patent [19]
Ito et al.

[11] Patent Number: 5,937,207
[45] Date of Patent: *Aug. 10, 1999

[54] DATA-PROJECTION DEVICE FOR DISPOSABLE CAMERAS

[75] Inventors: Shinsuke Ito; Masaaki Handa, both of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/845,512

[22] Filed: Apr. 24, 1997

[30] Foreign Application Priority Data

Apr. 25, 1996 [JP] Japan ................................. 8-105314
Nov. 5, 1996 [JP] Japan ................................. 8-292963

[51] Int. Cl.⁶ ............................. G03B 17/02; G03B 17/24
[52] U.S. Cl. ............................................... 396/6; 396/318
[58] Field of Search ............................. 396/6, 318, 316, 396/315

[56] References Cited

U.S. PATENT DOCUMENTS 5,630,177  5/1997  Yamada et al. ........................ 396/6
5,721,990  2/1998  Akaiwa et al. ................... 396/318 X
5,721,993  2/1998  Ito et al. ............................. 396/315

FOREIGN PATENT DOCUMENTS 56-139141  3/1981  Japan.
56-101135  8/1981  Japan.

*Primary Examiner*—W. B. Perkey
*Attorney, Agent, or Firm*—Michael T. Gabrik

[57] ABSTRACT

A data-projection device particularly suited for disposable cameras that offers high reliability without the need for a dedicated monitoring device affixed thereto. A dedicated battery is embedded in this data-projection device and an associated battery terminal extends over the entire surface of the data-projection device. One of the circuit board surfaces securing the electrical components of the data-projection device is covered with an anti-electrostatic copper foil pattern which is connected to the battery, thus providing a shield effect with the battery terminal and the copper foil pattern strobe. Further, preferably, the strobe unit and the data-projection device are separated from each other by at least 2 mm. To reduce noise effects from introducing data display errors in the liquid crystal display spring area provided in the battery terminal and is fastened as the receiving area for the guide frame of the main body of the disposable camera to absorb impacts and a dedicated backup capacitor is installed to provide backup in the event the battery contacts are separated from the battery when the data-projection device or the camera it is attached to is jarred or dropped.

32 Claims, 13 Drawing Sheets

FIG. 8A 41 CS
FIG. 8B 43 DATA
FIG. 8C 42 SCK
FIG. 8D DATA
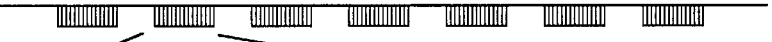
FIG. 8E SCK
FIG. 8F
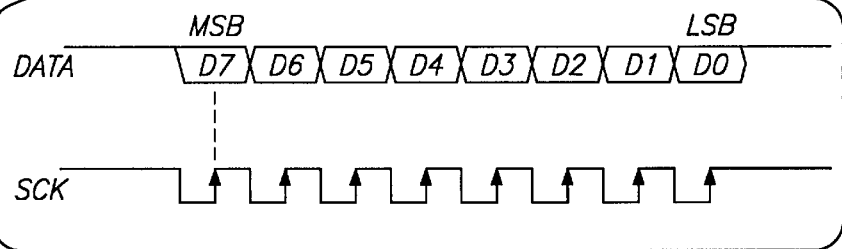
| Code | Processing Content |
|---|---|
| LHLXXXXX | Writing of Data |
| LLHXXXXX | Reading of Data |
X:H or L

DATA-PROJECTION DEVICE FOR DISPOSABLE CAMERAS

BACKGROUND OF THE INVENTION

1. Field of the Invention

The invention relates to an optical data-projection device that projects data such as the date onto photographic film.

2. Description of the Related Art

Conventional data-projection devices for use in cameras typically include a liquid crystal panel capable of displaying data such as date and time and, define a light path for guiding light emanating from a light source through this liquid crystal panel. The light filtered by the LCD is then displayed on this liquid crystal panel is projected onto photographic film contained within the camera during exposure. In the most common arrangement, the data-projection device is installed on the back lid of the camera so as to face the back side of the film mounted in the camera, and uses a light source such as a lamp to project data onto a specific area (several millimeters) on the back side of the film.

By contrast, other configurations are proposed such as that disclosed in Japanese patent application No. S56-139141 which uses the externally generated light such as sunlight. FIG. 18 schematically shows the configuration of this camera. Photographing shutter 8 is positioned between camera photographing lens 6 and photographic film 16, and an image is projected onto area 13 of film 16 when shutter 8 opens. In addition to this optical system, transmission-type projection liquid crystal display device 3 which is capable of forming the data pattern to be projected onto the photographic film, is positioned between external light intake area 76 and photographic film 16. Therefore, after filtering by projection liquid crystal display device 3, external light 77 taken in from external light intake area 76 exposes photographic film 16 via data lens 9 and projects a data image corresponding to the data pattern onto area 12 of photographic film 16. This data-projection operation is controlled by photographing shutter 8 and occurs in synchronism with a normal photographing operation.

The above-described configuration results in lower manufacturing and parts costs because the data-projection device need not include an internal light source, and there is no need for a separate trigger signal generation device for data projection because the shutter of the camera is used as a projection trigger. This configuration also offers an advantage because the use of external light for projection results in a constant brightness ratio between the photographic object and the data to be projected, resulting in a constant photographic density of the projected data and making it possible to clearly project the data even in a camera lacking exposure correction. Therefore, this configuration is suitable to applications such as disposable cameras for which low cost is a prime concern.

However, the following problems exist when using the conventional ambient light driven data-projection device described hereinabove. When affixed to a disposable camera, such a data-projection device is positioned in the front part of the camera. Consequently, space cannot be allocated for a display device for monitoring the data to be projected because the front face must also accommodate a photographing lens and a shutter. Therefore, one conventional design trend is to reduce the size of the data-projection window and limit the data to be projected to year, month, and date only, by not offering data selection or correction, and by eliminating the typical mode selection/correction switch and the display device for monitoring. However, the lack of a monitor display and a correction switch makes it impossible to check for or correct faulty projection data, which can be caused by external noise such as static electricity and the impact of being dropped. And, particularly in the case of a disposable camera, the noise from the strobe circuit board during strobe charging or discharging can cause an error or malfunction when the data-projection device is positioned proximate the strobe circuit board.

It would be desirable if a function for checking data could be provided without the installation of a dedicated display device for monitoring. Accordingly, Japanese patent application No. S56-101135 discloses a known data confirmation method using ambient light in which a reflection mirror is installed on the top surface of a shutter located on the back of a projection liquid crystal display device so that display contents can be checked. A problem remains in this case, however, in that the data image viewed is inverted, thereby making confirmation difficult. Although it is possible to electrically invert the display, the font is predetermined and thus simple inversion will not make the confirmation of the projected data any easier.

OBJECTS OF THE INVENTION

In consideration of these and related problems, it is an object of the invention to provide a data-projection structure that will minimize errors and malfunction during normal usage.

It is a further object of the invention to enable data checking without the installation of a dedicated display device for monitoring thereby keeping production costs low.

SUMMARY OF THE INVENTION

In accordance with these and related objects, a dedicated battery is installed within the data-projection device of the present invention. The battery terminals extend over an entire surface of the data-projection device. Further, one of the circuit board surfaces is covered with an anti-electrostatic copper foil pattern and the pattern is connected to the aforementioned battery. Such a configuration can prevent external noise, such as static electricity and noise generated by strobe changing or discharge, from causing a display error in the data-projection device. Additionally, the battery is preferably installed in a non-removable manner, so that the impact of a fall, etc. will not separate the battery contacts from the battery. Moreover, preferably part of the battery contacts constitutes a spring in order to absorb the impact of a fall, etc., and a dedicated backup capacitor is installed to provide backup in the event the battery contacts are separated from the battery. Such a configuration can prevent the impact of a fall from causing a display error.

Furthermore, according to the present invention, data output terminals may be provided on the surface of the disposable camera to which the data-projection device may be affixed. Connecting these terminals to an external data display device enables data confirmation and correct functionality. Additionally, the front part of the liquid crystal display device for data projection of the package of the disposable camera is preferably transparent, and a reflective sheet is positioned on the surface of the shutter located on the back of the liquid crystal display device, so that the data reflected by the reflective surface of the shutter can be confirmed through the package surface. Since the display on the liquid crystal is inverted, an optic adaptor may be used on board the camera to invert the display and to enable clearly visible confirmation thereof. With such a configuration, a user can confirm projection data when he or she purchases a disposable camera, without the installation of a dedicated data-display device.

Other objects and attainments together with a fuller understanding of the invention will become apparent and appreciated by referring to the following description of a specific preferred embodiment and claims, taken in conjunction with the accompanying drawings.

BRIEF DESCRIPTION OF THE DRAWINGS

In the drawings, wherein like reference symbols refer to like parts:

FIGS. 8A–8E are overall and detailed serial communication timing diagrams respectively of the data-projection device of FIG. 7;

FIG. 8F is an instruction chart for serial communication shown in FIGS. 8A–8E;

DESCRIPTION OF THE PREFERRED EMBODIMENT

Figure 1:
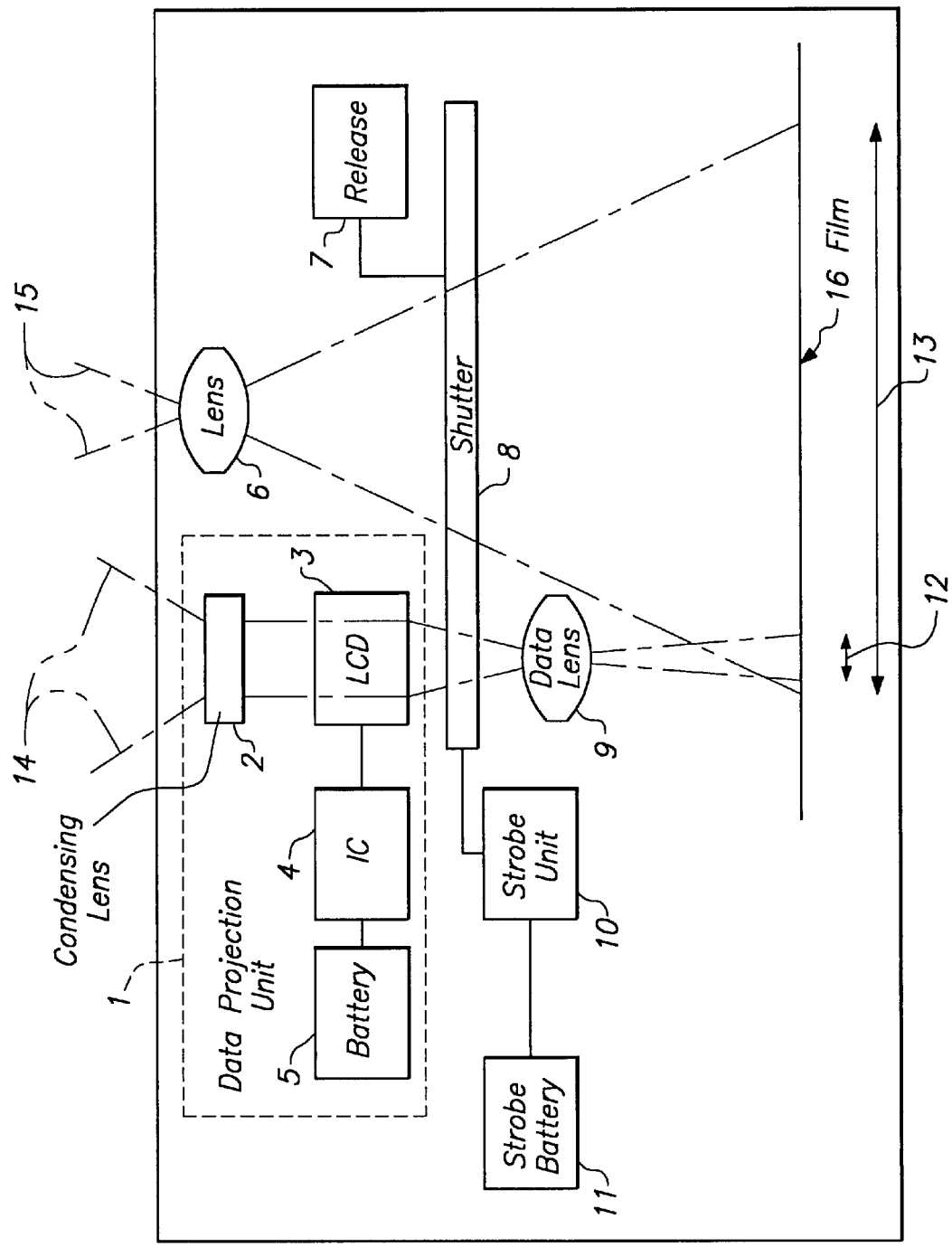
FIG. 1 is a configuration diagram of an example disposable camera in which the data-projection device according to the present invention has been installed.

FIG. 1 shows the configuration of an example disposable camera in which the data-projection device according the presently preferred embodiment of the invention has been installed. Data-projection device 1 is positioned on the photographing lens 6 side of photographing shutter 8, next to photographing lens 6. Because strobe unit 10 is positioned next to shutter 8 in a disposable camera, the data-projection device is positioned on the photographing lens side of strobe unit 10.

An explanation of data projection operation of this camera follows hereinbelow. Pressing release 7 opens shutter 8, allowing photographing light 15 to be projected onto film 16 through the photographing lens in the main body. Furthermore, strobe unit 10 discharges light simultaneously with the opening of shutter 8. In this embodiment, shutter 8 also acts as the activation shutter for the data-projection area. Therefore, simultaneously with the opening of shutter 8, light 14 condensed by condensing lens 2 passes through projection liquid crystal display device 3 and forms an image in data-projection area 12 of film 16 with data lens 9. Data-projection area 12 becomes part of photographing area 13 of photographing lens 16. Consequently, data is also projected simultaneously when a photograph is taken. The use of a single shutter for both photograph taking and data projection eliminates the need for data-projection trigger, thus enabling data projection using a simple mechanism. When the transmittance of projection liquid crystal display device 3 is around 20% and shutter 8 is shared for both photographing and imprinting, the light 14 used for the projection data is consequentially darker than that of the photographing lens due to projection translucent light loss caused by liquid crystal display device 3. Therefore, condensing lens 2 collects and condenses available ambient light to make the light 14 of the projection data as bright as the photographing light 15. In so doing, interior of condensing lens 2 has Fresnel shape so that it can collect the ambient light. Though not shown in this figure, it is also possible to collect the amount of light necessary for data projection by using a dedicated data-projection shutter instead of a condensing lens and by altering the amount of time the shutter remains open, as is well known in the art.

Battery 5 of the data-projection device is exclusively used in conjunction with the data-projection device, is kept separate from strobe battery 11, and is installed inside data-projection device 20. Although it is possible to share the strobe battery 11 in order to achieve further size and cost reductions, such an option is not used in the preferred embodiment for the following reason. When strobe battery 11 is shared, strobe unit 10 and the data-projection device become connected via the battery, and consequently the fall in the battery voltage during strobe charging or the massive voltage during strobe charging may enter the data-projection device, reducing its reliability.

Figure 2:
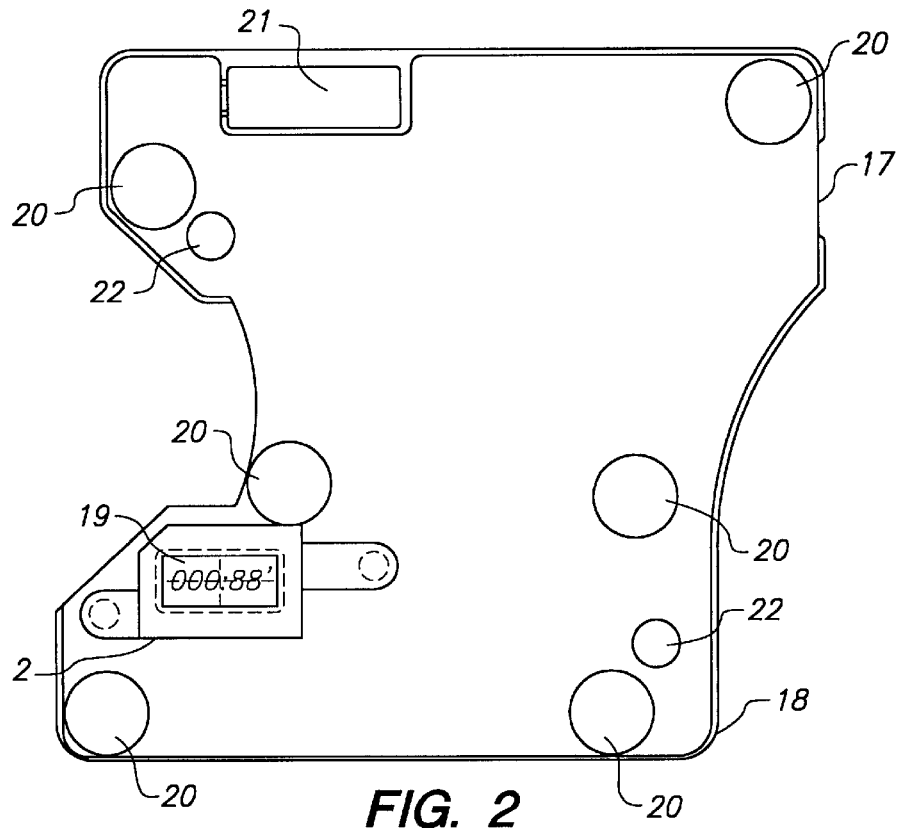
FIG. 2 is a front planar view of the data-projection device according to the presently preferred embodiment of the invention.
Figure 3:
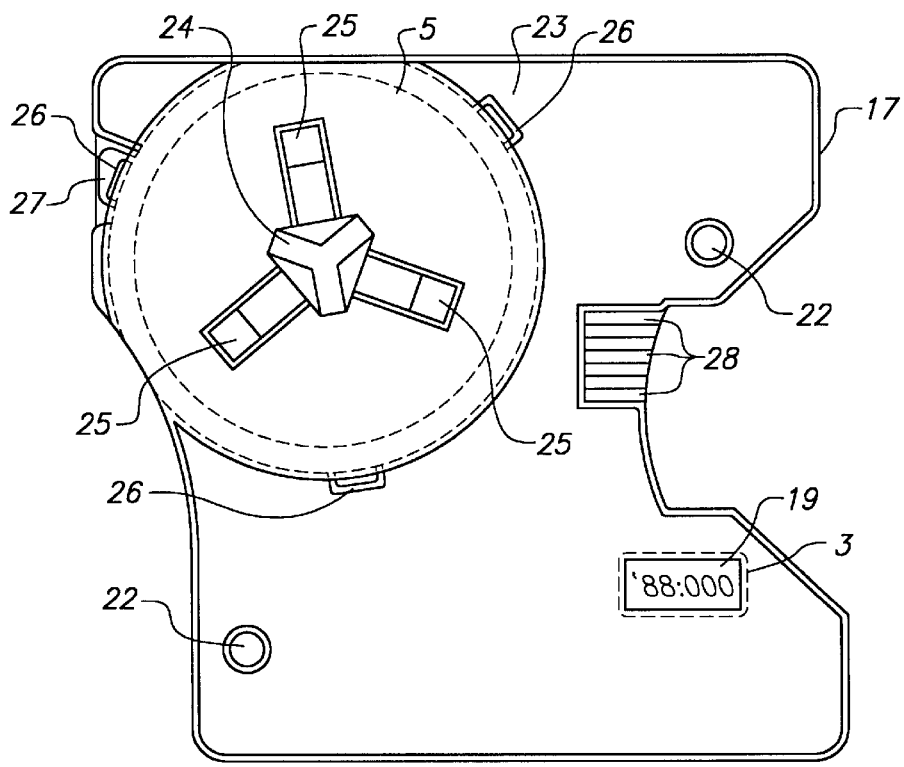
FIG. 3 is a rear planar view of the data-projection device of FIG. 2.

FIG. 2 is a front planar view of the presently preferred data-projection device; and FIG. 3 is the rear view of the same. The data-projection device comprises circuit board 17 with an IC and electrical components mounted thereon, panel frame 18, condensing lens 2, projection liquid crystal display device 3 therebeneath (FIG. 3), battery 5, and battery terminal 23. Reference numeral 19 refer to the characters displayed on the projection liquid crystal display device. Because the data is fixed to year, month, and date in this embodiment, only characters necessary for projecting year/month/date onto the film are used. Characters 19 are inverted in the front view of FIG. 2 and shown normally in the rear view of FIG. 3. Reference numeral 20 indicates the heat-crimping area for fastening circuit board 17 to panel frame 18. Reference numeral 22 refers to a guide hole for installing the data-projection device in a disposable camera such as that shown in FIGS. 9 and 13 and described in more detail hereinbelow.

The data-projection device is structured so that projection liquid crystal display device 3 is held between circuit board 17 and panel frame 18. The protrusion from panel frame 18 is aligned to pass through the hole 22 in circuit board 17, and is then fastened using heat crimping. In this embodiment, heat crimping area 20 is provided in six locations.

Following the heat crimping, battery 5 is installed and electrically secured using battery terminals 23. After battery 5 is installed, the data setting device is connected to data setting/confirmation terminal 28, and setting of year/month/date and time data is performed. The data setting method will be explained in detail hereinbelow. Lastly, after the characters 19 of the data of the projection liquid crystal display device 3 is confirmed, condensing lens 2 is fastened to circuit board 17. Although not shown herein, it is also possible to fasten condensing lens 2 to the body case of the disposable camera.

Figure 4:
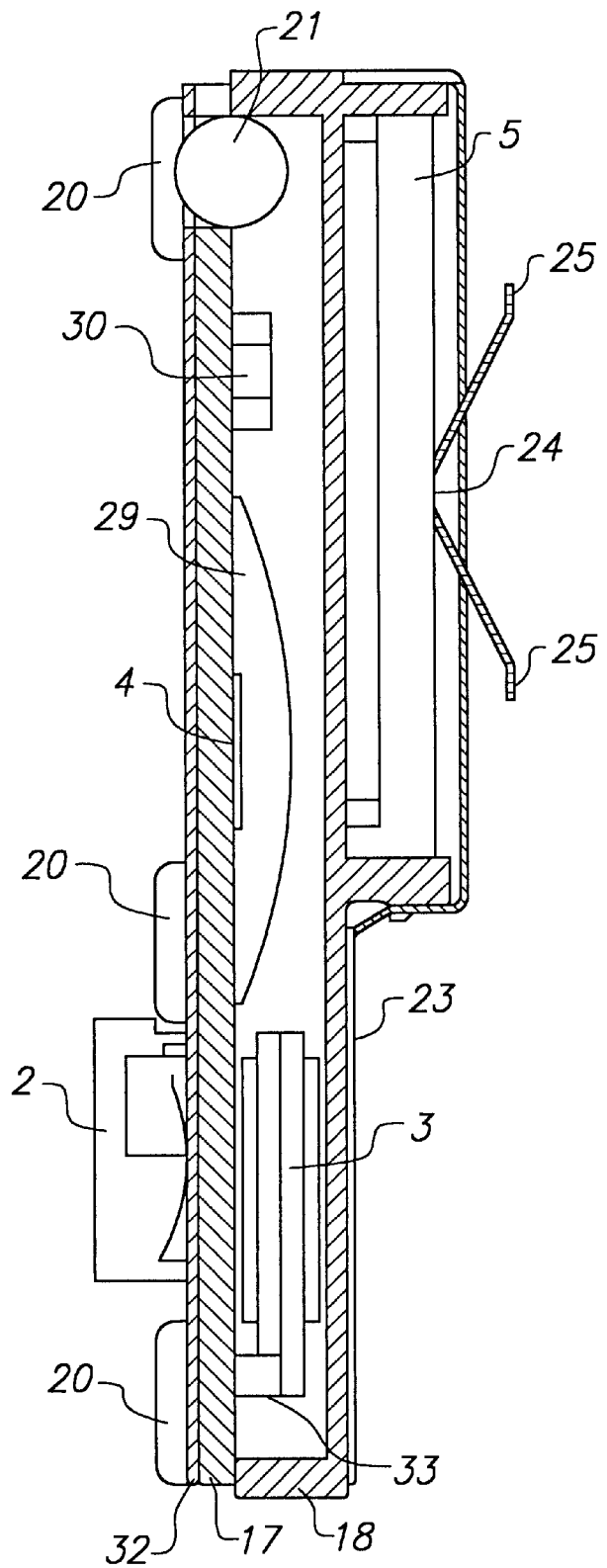
FIG. 4 is a cross-section of the data-projection device of FIG. 2.
Figure 5:
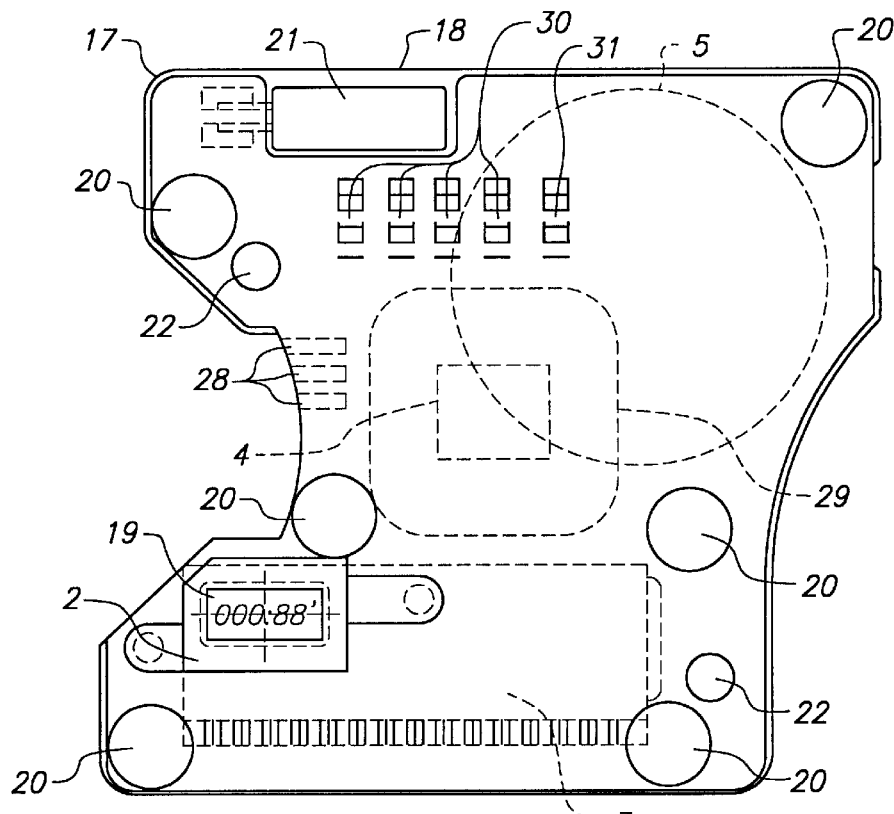
FIG. 5 is a planar schematic view of the data-projection device of FIG. 2.

FIG. 4 shows a cross-section of the preferred data-projection device; and FIG. 5 shows a planar schematic view thereof. In FIG. 5, battery terminals 23 are omitted for the sake of clarity. A clock circuit for year/month/date data (not shown), IC 4 equipped with a drive circuit for driving the projection liquid crystal display device, mold 29 for protecting the IC, capacitor 30 for voltage boosting, backup capacitor 31, and quartz 21 are mounted on circuit board 17 on the side of panel frame 18. Because quartz 21 is thicker than other components, part of the circuit board is shaved to partially embed the quartz in the circuit board during assembly. The side of circuit board 17, opposite from the assembly surface in which the aforementioned electrical components are populated, is covered with copper foil pattern 32. Although pattern 32 is not shown in FIG. 4 or FIG. 5 so as not to obscure the remaining structure, (instead see FIG. 12) it is connected to battery e.g. 5. Zebra connector 33 is used for connecting projection liquid crystal display device 3 and circuit board 17.

The method of fastening battery 5 and battery terminal 23 will be explained in detail using FIGS. 3 and 4. Battery 5 is fastened by being pressed down by panel frame 18 and battery terminal 23. Because battery 5 has sufficient capacity to last until the disposable camera's expiration date and thus need not be replaced, it is positioned toward the rear side of the data-projection device as viewed from the photographing lens of the disposable camera. Battery terminal 23 is fastened to latching area 26 of panel frame 18 so that battery 5 will not be disengaged by the impact of a fall, etc. Furthermore, connection area 27 for circuit board 17 is provided with a spring characteristic to form a pressure connect with the circuit board. Fastening this area using solder would further improve the reliability of the battery connection.

Figure 6:
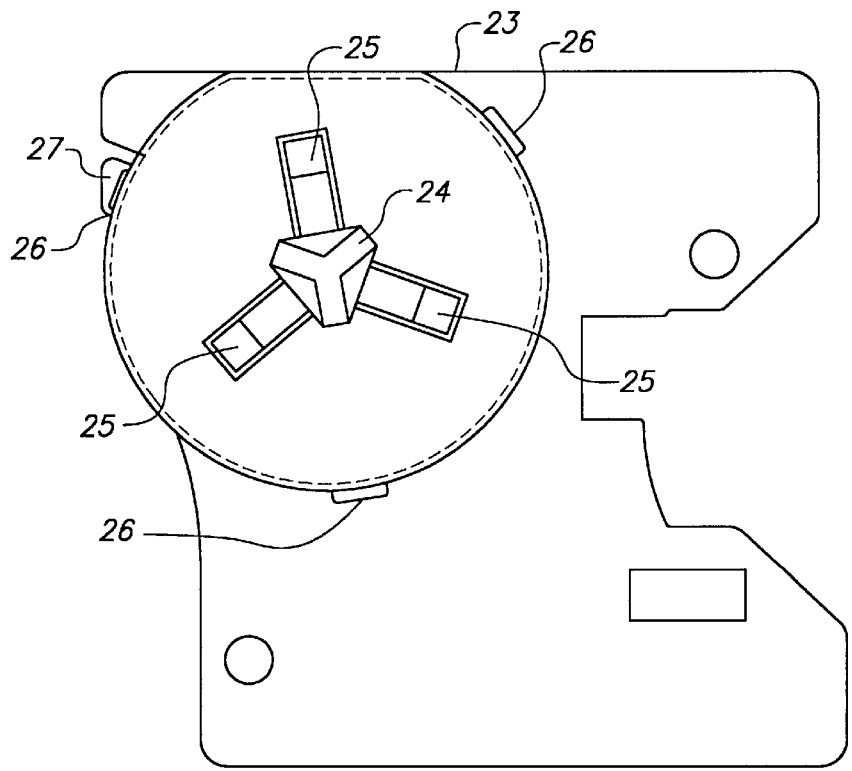
FIG. 6 is a top view of the battery terminal of the data-projection device of FIG. 2.

FIG. 6 is a plan view of battery terminal 23. In FIGS. 5 and 6, battery terminal 23 has a shape that almost completely covers battery 5 and panel frame 18. Contact point 24 is fastened in three locations to the contact area between battery terminal 23 and battery 5 so that it presses down on the battery surface when battery terminal 23 is fastened, thus preventing it from being disengaged by the impact of a fall, etc. Although three contact points are used in this embodiment, a larger number of contact points would of course increase the reliability at the expense of manfacturability. It is also possible to use soldering for fastening this area as well. Spring area 25 protrudes around contact points 24 in the direction opposite from battery 5. When installed in the main body of the disposable camera, this spring area 25 becomes the receiving area for the main body guide area and acts as a shock absorber for impact events involving the presently preferred data-projection device.

Backup capacitor 31 is connected to an area near the power supply terminal of IC 4, and maintains the power supply voltage should the power supply battery be temporarily disconnected. Note that the capacity of backup capacitor 31 needs to be at least 0.1~0.5 [$\mu$F] larger than formula $C=it/\Delta V$ if the time (t) during which the power supply is disconnected lasts for tens of milliseconds, the current consumption (i) of the system is approximately 2 [$\mu$A], and the voltage decline ($\Delta V$) is kept within 0.5 [V].

Figure 7:
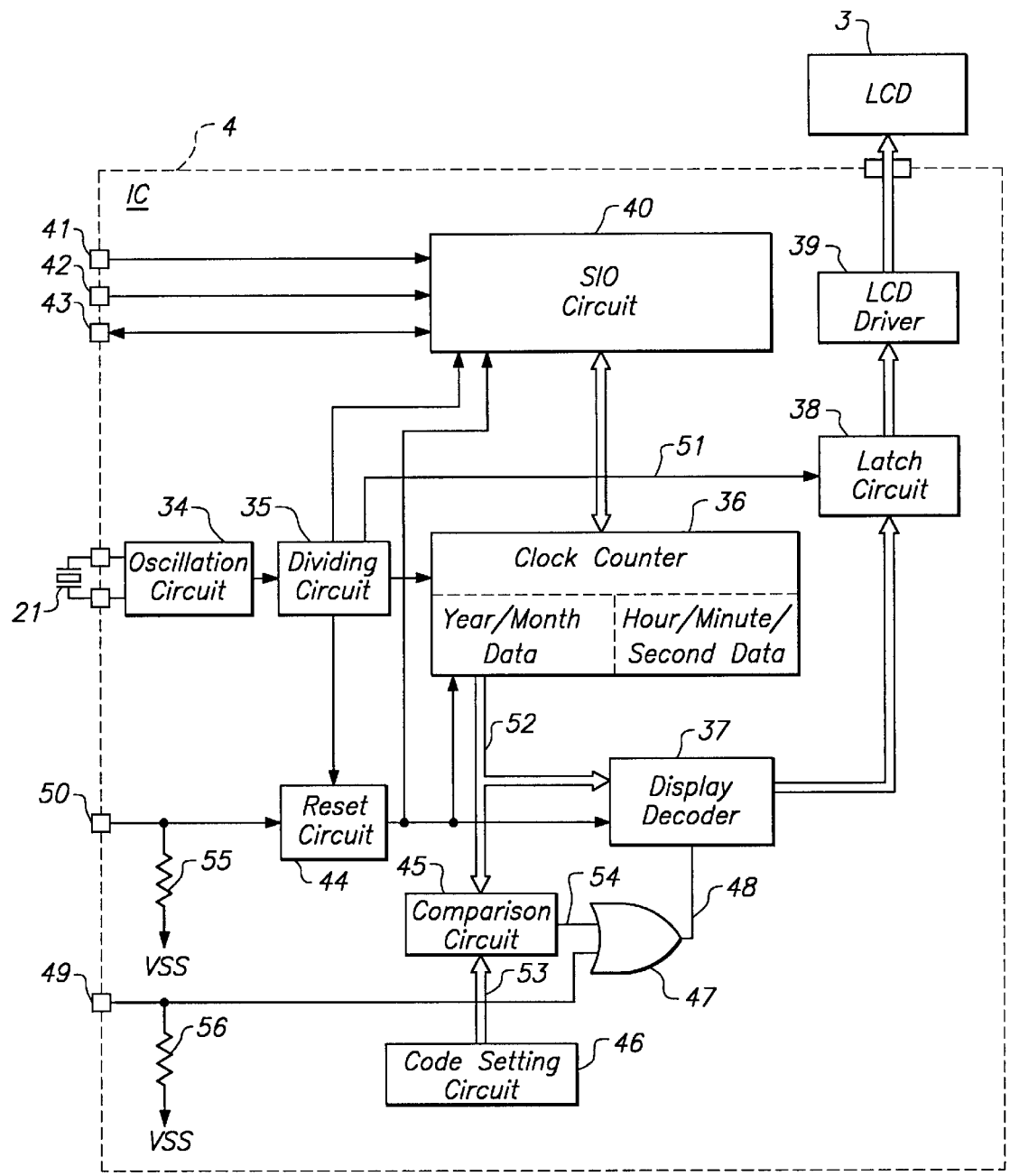
FIG. 7 is a circuit block diagram of the data-projection device according to the preferred embodiment of the invention.

Next, the data setting (writing) and confirmation (reading) according to the preferred embodiment will be explained hereinbelow with references to FIG. 7 and FIGS. 8A–8F. FIG. 7 is a block diagram of IC 4; and FIGS. 8A and 8B are timing diagrams of the serial interface (hereafter referred to as "SIO circuit") between the data-projection device according to the preferred embodiment and an external data write/read device.

In FIG. 7, IC 4 includes oscillation circuit 34, dividing circuit 35, clock counter 36, display decoder 37, latch circuit 38, LCD driver 39, SIO circuit 40, reset circuit 44, comparison circuit 45, code setting circuit 46, OR gate 47, and pull-down resistors 55 and 56. Quartz oscillator 21 is connected to oscillation circuit 34, and projection liquid crystal display device 3 is connected to LCD driver 39, as external circuits to IC 4. Three pins for SIO (CS pin 41, SCK pin 42, and DATA pin 43) are provided which are connected to the external circuit for writing/reading clock data (year/month/day/hour/minute/second). SR pin 50 for IC reset and test pin 49 for test modes are also provided. Of the pins for SIO 40, CS pin 41 and SCK pin 42 receive signals from outside circuits. CS pin 41 goes active during data transmission, and during that period the clock data is written/read via DATA pin 43 synchronously with the external clock that is input into SCK pin 42.

Next, communication of clock data by SIO circuit 40 will be explained using FIGS. 8A–8F. Data communication begins when CS pin 41 goes "L" (active). Then, the data sent to DATA pin 43 synchronously with the clock that is input into SCK pin 42 is received. The data to be received is read into DATA pin 43 at the rising timing of the clock signal.

The first byte of the data is an instruction code that specifies the method for processing the data that follows. In this embodiment, data writing is executed when the instruction code is "LHLXXXXX", and data reading is executed when the instruction code is "LLHXXXXX" (see FIG. 8F). The clock data to be written or read in a single data communication cycle consists of a total of six bytes, i.e., bytes 2 through 7 indicated in FIG. 8D. Byte 2 represents the year data, byte 3 represents the month data, byte 4 represents the date data, byte 5 represents the hour data, byte 6 represents the minute data, and byte 7 represents the second data. The upper four bits of each byte indicate the tens digit while the lower four bits indicate ones digit of the associated data.

The data that has been written is sent to clock counter 36, and counting continues synchronously with the count-up clock from dividing circuit 35. Year/month/date data 52 from clock counter 36 is decoded by display decoder 37 and is displayed in externally-connected projection liquid crystal display device 3 via latch circuit 38 and LCD driver 39. Display decoder 37 is controlled by display enable signal 48, outputs the data without changing it when the display enable signal is "H", and outputs a blank image when the display enable signal is "L". Latch circuit 39 fetches the display data from display decoder 37 based on latch signal 51 from dividing circuit 35. Since the display only shows the year, month and date in this example, the display data need only be fetched once a day. However, because the data inside latch circuit 38, which is physically and electrically near the projection liquid crystal display device, might be altered by external noise, etc., latch signal 51 is set to 1 to 5 Hz by taking current consumption into consideration.

As explained above, because the current time can be set and confirmed based on communication from the outside and because only a single year/month/date display mode is provided, the display panel or monitor display, mode switch, selection switch, and correction switch all become unnecessary. The present invention thereby provides an improved data-projection device for a camera without a dedicated monitor display.

Figure 9:
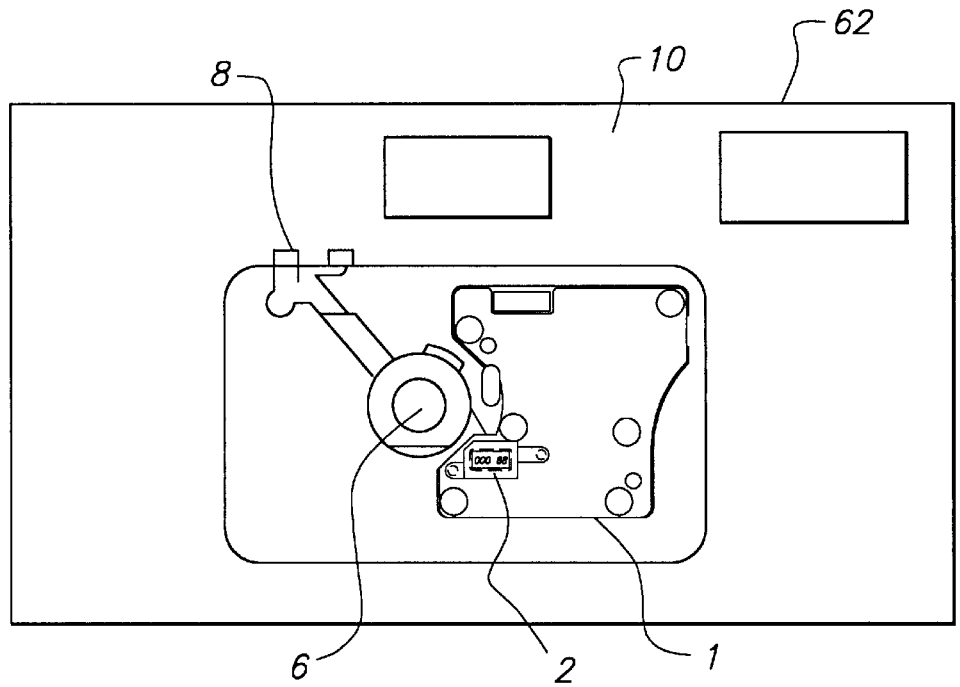
FIG. 9 is a front schematic view schematically showing the presently preferred data-projection device installed in the disposable camera of FIG. 1.

FIG. 9 is a front planar view schematically showing the state in which the presently preferred data-projection device is installed in a disposable camera. In this figure, data-projection device 1 is positioned to the right of photographing lens 6, overlapping strobe unit 10. Photographing shutter 8 extends to the back side of projection liquid crystal display device 3. Condensing lens 2 is located below photographing lens 6.

Figure 10:
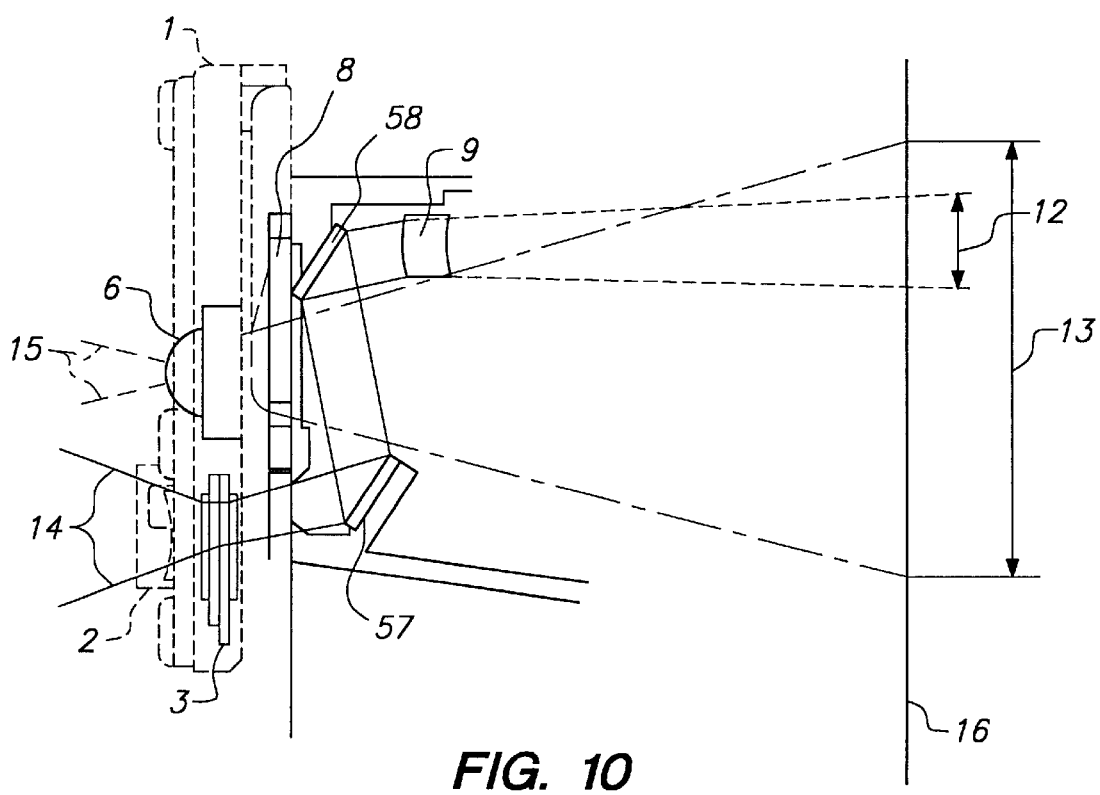
FIG. 10 is a partial horizontal cross-section of the assembly of FIG. 9.

FIG. 10 is a schematic cross-section of the assembly of FIG. 9 viewed from the transverse direction. Normally, the projection data is projected onto the bottom side of the final photograph. Since the photograph image is projected onto the film after being inverted by the photographing lens, the projection data must be projected onto the top side of the film. However, in FIG. 10, data lens 9 must be positioned as close to photographing lens 6 as possible in order to prevent eclipsing of photographing light 15. In this case, it is preferable to position projection liquid crystal display device 3 near photographing lens 6 in order to avoid increasing the size of the disposable camera. However, the distance between projection liquid crystal display device 3 and data lens 9 becomes shorter than the distance between data lens 9 and film 16, resulting in a data-magnifying optical system and projection data that is too large relative to the photograph. Therefore, in order to increase the distance between projection liquid crystal display device 3 and data lens 9, projection liquid crystal display device 3 is positioned below photographing lens 6, and the light from the projection liquid crystal display device is reflected by reflection mirror 57 onto an area above photographing lens 6, and is then reflected by second reflection mirror 58 toward data lens 9, as a result extending the distance to data lens 9. In this way, the length of the optical path from projection liquid crystal display device 3 to data lens 9 becomes nearly equal to the optical path from the data lens 9 to film 16. This results in nearly equal data magnification rates.

Figure 11:
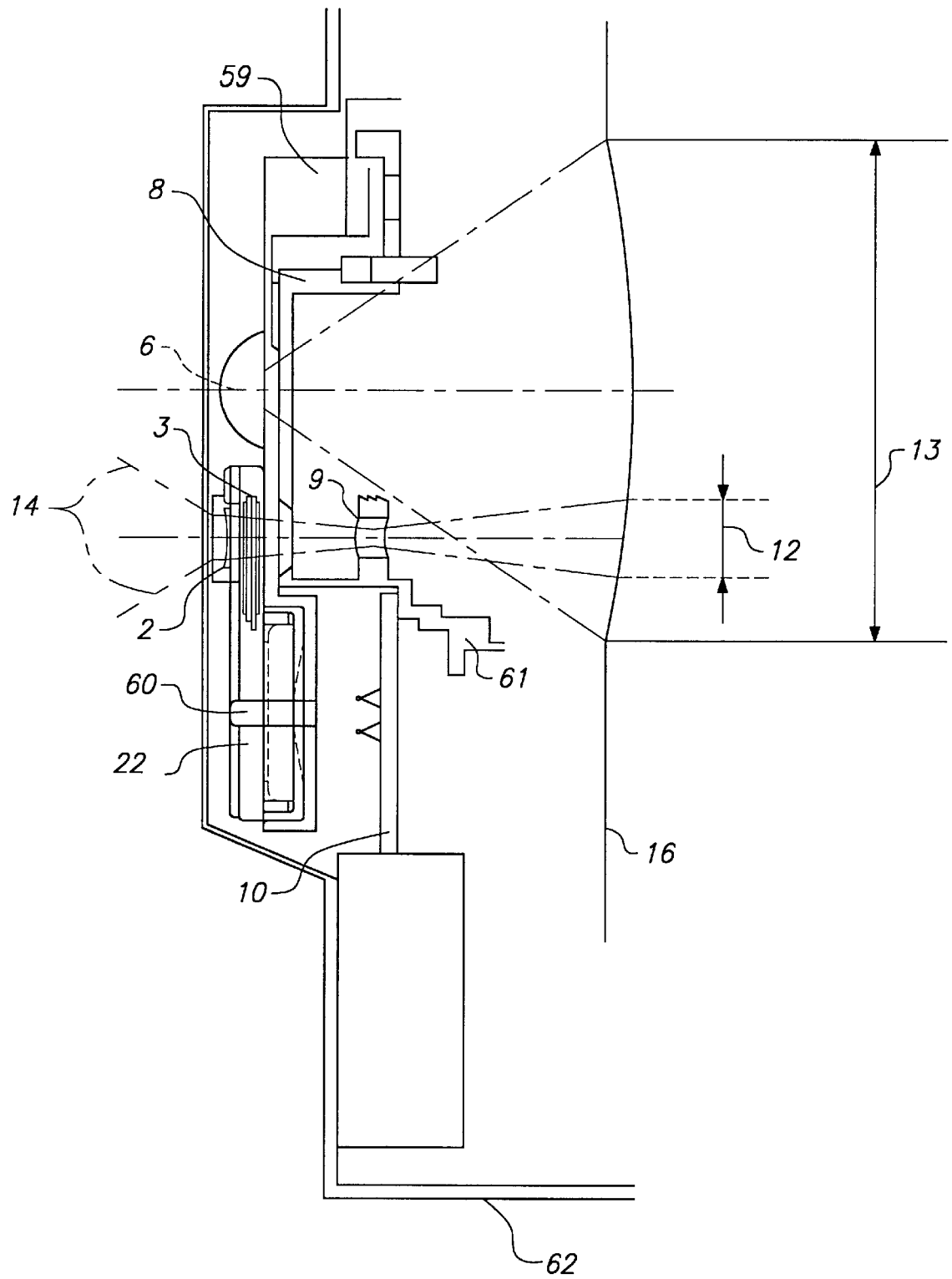
FIG. 11 is a partial vertical cross-section of the assembly of FIG. 9.

FIG. 11 is a schematic cross-section of the assembly of FIG. 9 viewed from the top direction. Shutter guide frame 59 which guides photographing shutter 8 is positioned from the front face of shutter 8 all the way to the bottom side of data-projection device 1. Protrusion 60 for fastening the data-projection device 1 to the camera 10 protrudes from shutter guide frame 59, and is secured through guide hole 22 of the data-projection device.

Figure 12:
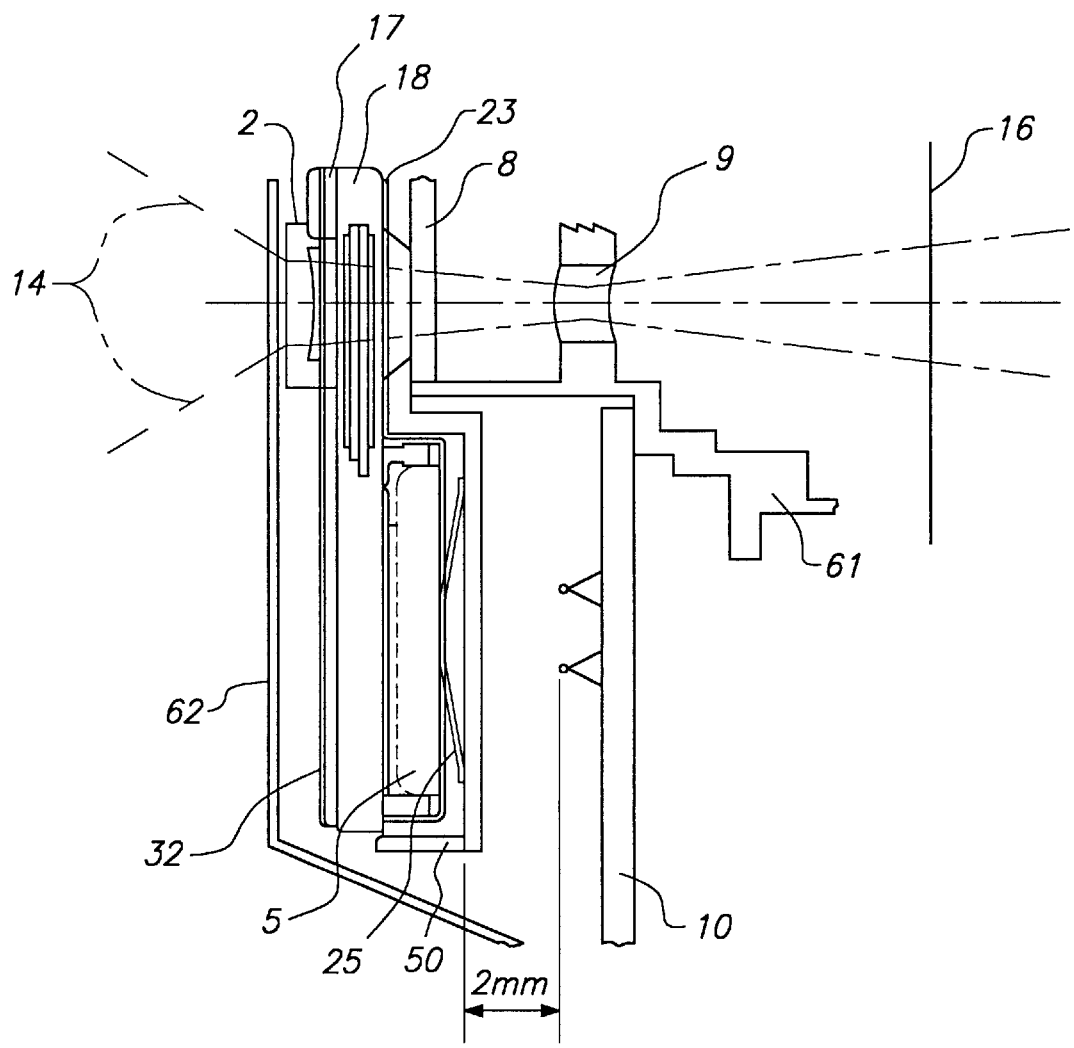
FIG. 12 is a more detailed view of the assembly of FIG. 11.

When shutter 8 opens, the light from the photographing object enters from photographing lens 6 into area 13, and is projected onto film 16. At the same time, light 14 which is condensed by condensing lens 2 is filtered into the shape of the data when it passes through projection liquid crystal display device 3, and proceeds to data lens 9. Although the light is actually reflected by two reflection mirrors before proceeding to the data lens, the reflection mirrors are not shown herein in order to simplify and reinforce the concepts of the present invention. The data is projected onto area 12 of the film by data lens 9. Data lens 9 is fastened to main body by frame 61 of the disposable camera. FIG. 12 shows a magnified view of part of FIG. 11, focusing in on the area in which the battery is installed.

As explained earlier, the side of circuit board 17 on which condensing lens 2 is located, is completely covered with copper foil pattern 32 and is connected to battery 5. This is the area of the data-projection device close to the exterior of the disposable camera. Noise such as static electricity, that adversely affects ICs, enters this area from external sources, as is well known in the art. By covering this area with copper foil pattern 32 and connecting it to the battery, pattern 32 acts as a shield against noise from outside, and thus can prevent malfunction due to an external noise malfunction resulting in a display error in the projection data. Condensing lens 2 likewise inherently acts as a shield for preventing external noise from entering projection liquid crystal display device 3. Battery terminal 23 covers the entire surface of panel frame 18 and acts as a shield against the noise generated while the strobe is being charged by strobe unit 10 located on the back side of the data-projection device. Furthermore, by fastening the data-projection device in front of shutter guide frame 59, the data-projection device is positioned approximately 2 mm away from the strobe unit, i.e., in a location that receives, at most, only attenuated noise signals emanating from strobe unit 10. Spring holding area 25 is fastened to battery terminal 23 to receive shutter guide frame 59. During an impact event, etc., this spring area 25 is designed to absorb the impact from the disposable camera main body to the data-projection device and prevents the impact from causing a display error in the data-projection device. Providing battery terminal 23 with spring area 25 can reduce the impact that will be imparted to the data-projection device, without the installation of a component dedicated for impact absorption.

Figure 13:
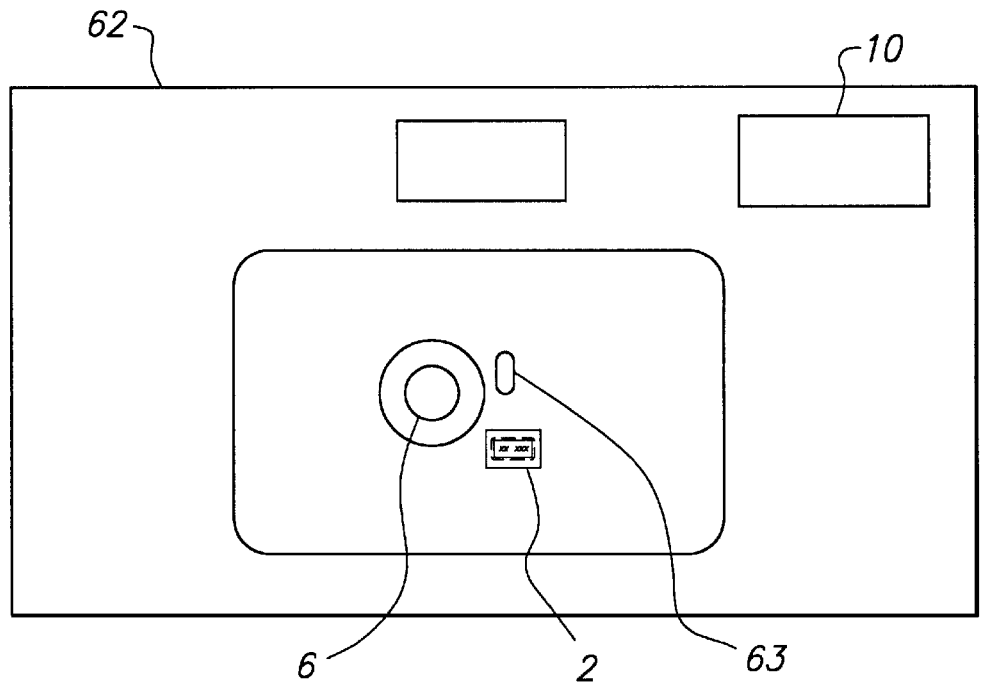
FIG. 13 is a front plan view of the assembly of FIG. 9.

Next, techniques for confirming and correcting data after the presently preferred data-projection device has been installed in a disposable camera will be explained. Data is set and confirmed using the data setting/confirmation device of the data-projection device explained hereinabove. FIG. 13 shows an external front plan view of a disposable camera in which the data-projection device according to the invention has been installed. Main body case 62 includes photographing lens 6, condensing lens 2, and a hole for strobe unit 10, all of which are exposed to the outside of main body case 62. A terminal hole 63 for data setting/confirmation is provided next to condensing lens 2, and data setting/confirmation terminals 28 of the data-projection device as shown in FIG. 5 are located inside this terminal hole. However, since data setting/confirmation terminals 28 of the data-projection device are installed on the back side of the data-projection device as viewed from the main body case, they cannot be accessed directly through circuit board 63 hole in the main body case. Therefore, terminals 64 (FIG. 14) for connecting a setting device are fastened to data setting/confirmation terminals 28 of the data-projection device in advance using soldering or pressure welding.

Figure 14:
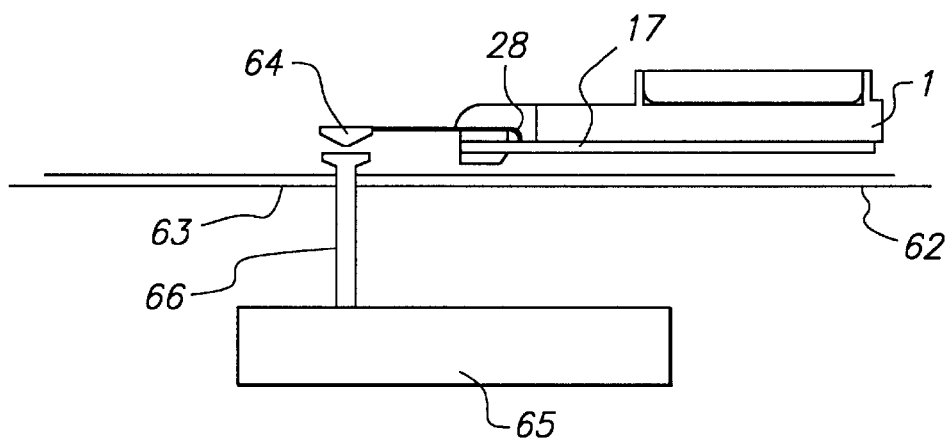
FIG. 14 is a partial vertical cross-section of the assembly of FIG. 13 illustrating the data setting/confirmation device according to the preferred embodiment installed therein.

FIG. 14 is a cross-section showing the data setting/confirmation device connected to the data-projection device according to the preferred embodiment inside a disposable camera. To confirm data, connection terminal 66 of data setting/confirmation device 65 is inserted into the terminal hole in the main body cover of the disposable camera and is connected to terminal 64 extending from the circuit board 17. The data that is being displayed in the data-projection device is transferred to setting/confirmation device 65 and can then be confirmed. If the displayed data is abnormal, if the date is incorrect, or if data display is stopped, it is possible to reset the data. In this way, the data can be confirmed or reset even after the data-projection device has been installed in the disposable camera. The data confirmation/correction device can be installed in a store for use when a disposable camera is sold, or can be separately purchased and used by the buyer of the disposable camera.

This section explains how the presently preferred data-projection device handles an erroneous reset.

Figure 15:
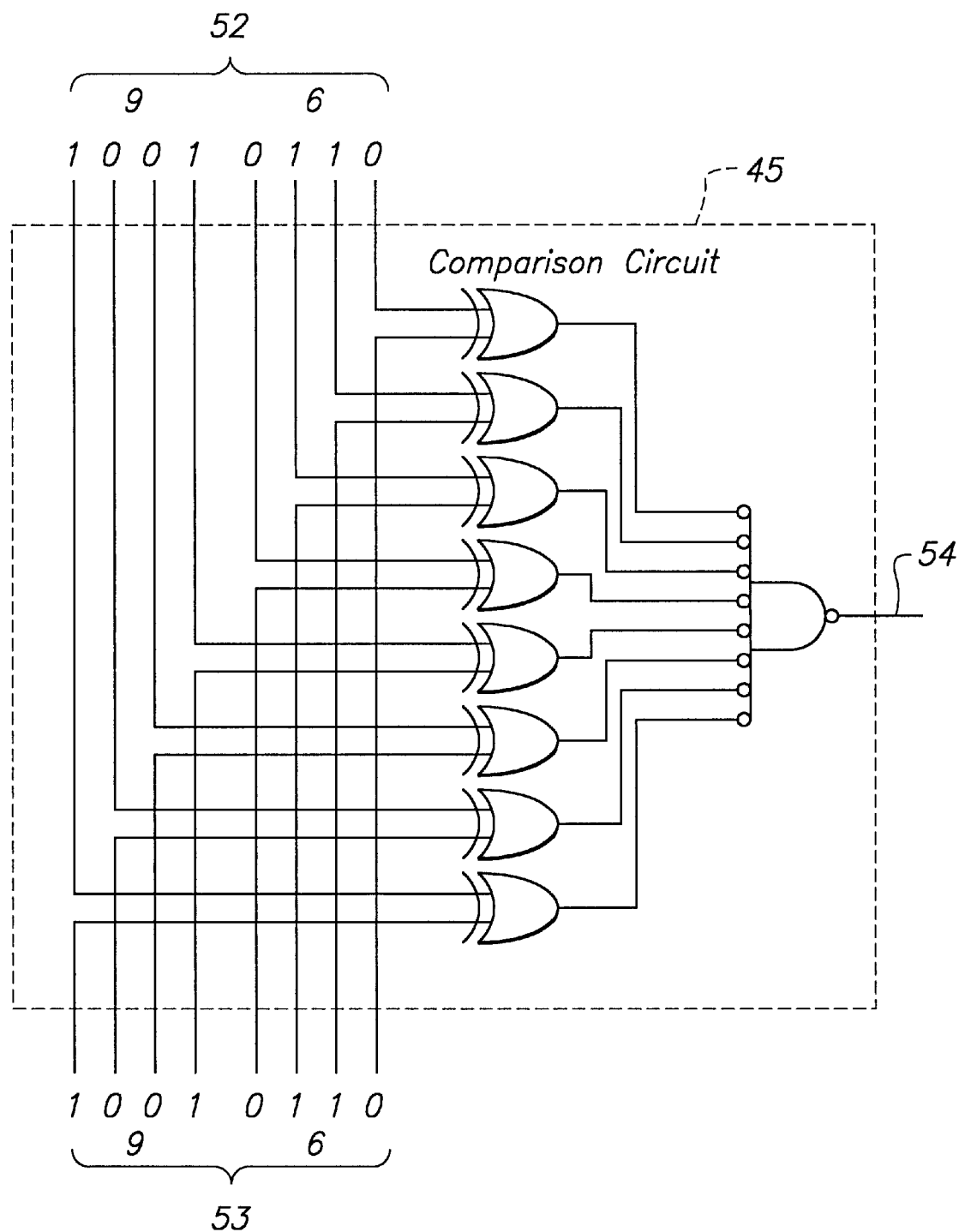
FIG. 15 is a diagram of the comparison circuit within the presently preferred data-projection device of the invention.

FIG. 15 depicts the comparison circuit 45 initially shown in FIG. 7, which consists of eight 2-input XOR gates and one 8-input OR gate. In this example, of the year/month/date data 52, only the year data (tens and ones digits) is compared to set data 53. In most designs, the internal clock data is usually initialized to January 1, 19XX 00:00:00 when the IC is reset (where "XX" is the yearsest of the years that are handled).

In this embodiment, the initial value is set to 1996 assuming that the disposable camera will be used in 1997 or later. Meanwhile, the content of set data 53 is also set to 1996. If reset is erroneously by external noise, etc. during operation, the year data in clock counter 36 is set to 1996. Since set data 53 has been set to 1996, comparison result 54 of comparison circuit 45 becomes "L". Because the test terminal is normally pulled down to VSS by pull-down resistor 55 and is set to "L", display enable signal 48 which is the output of OR gate 47 becomes "L". Consequently, display decoder 37 goes into a display disabled status and blanks out the display output. As a result, nothing will be displayed in the projection liquid crystal display device, and thus incorrect data will not be projected onto the film even if a projection process is executed. In this example, it is possible to disable projection for one year if no clock data is written after reset.

Note that although a code setting circuit is provided inside IC 4 in this example, it is also possible to lead out the circuit in the form of terminals and to set codes on the circuit board. Furthermore, although only the year data for 1996 was compared here, it is also possible to adjust the projection-disabled period by changing the value or range of the data to be compared.

Additionally, by setting test terminal 49 to "H" during testing, it is possible to set the display enable signal to "H" and display data in the projection liquid crystal display device, regardless of the result of comparison circuit 45.

Because the above operation blanks out data display on the projection liquid crystal display device when reset occurs, the projection liquid crystal display device does not let light through even when the shutter is opened, and thus no risk exists for wrong data being projected.

Another alternative technique for confirming the projection data is explained below.

Figure 16:
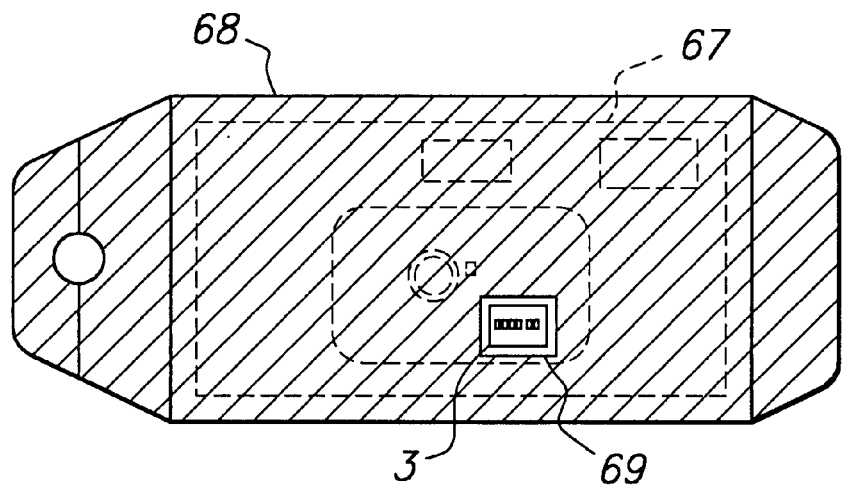
FIG. 16 illustrates the disposable camera assembly of FIG. 9 wrapped inside a package.
Figure 17:
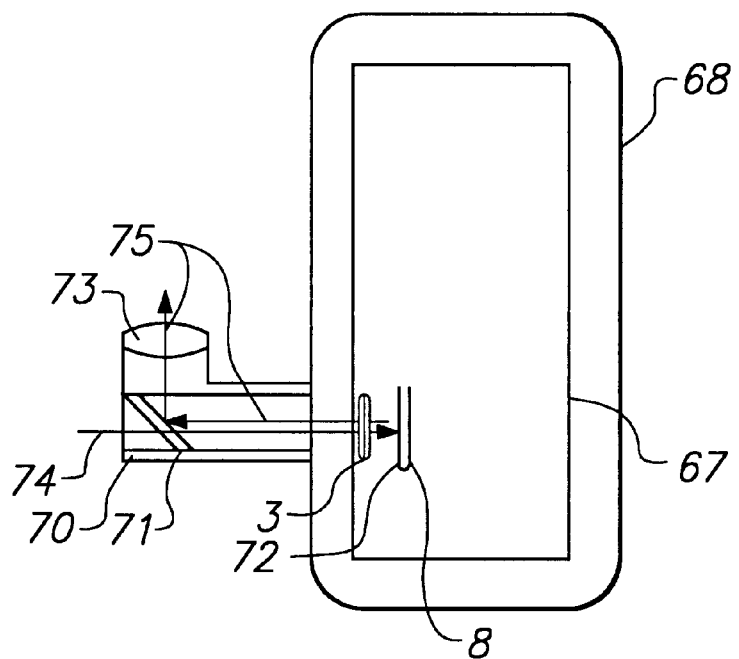
FIG. 17 is a cross-section diagram in which a data-projection adapter according to the preferred embodiment is attached to the package of FIG. 16.
Figure 18:
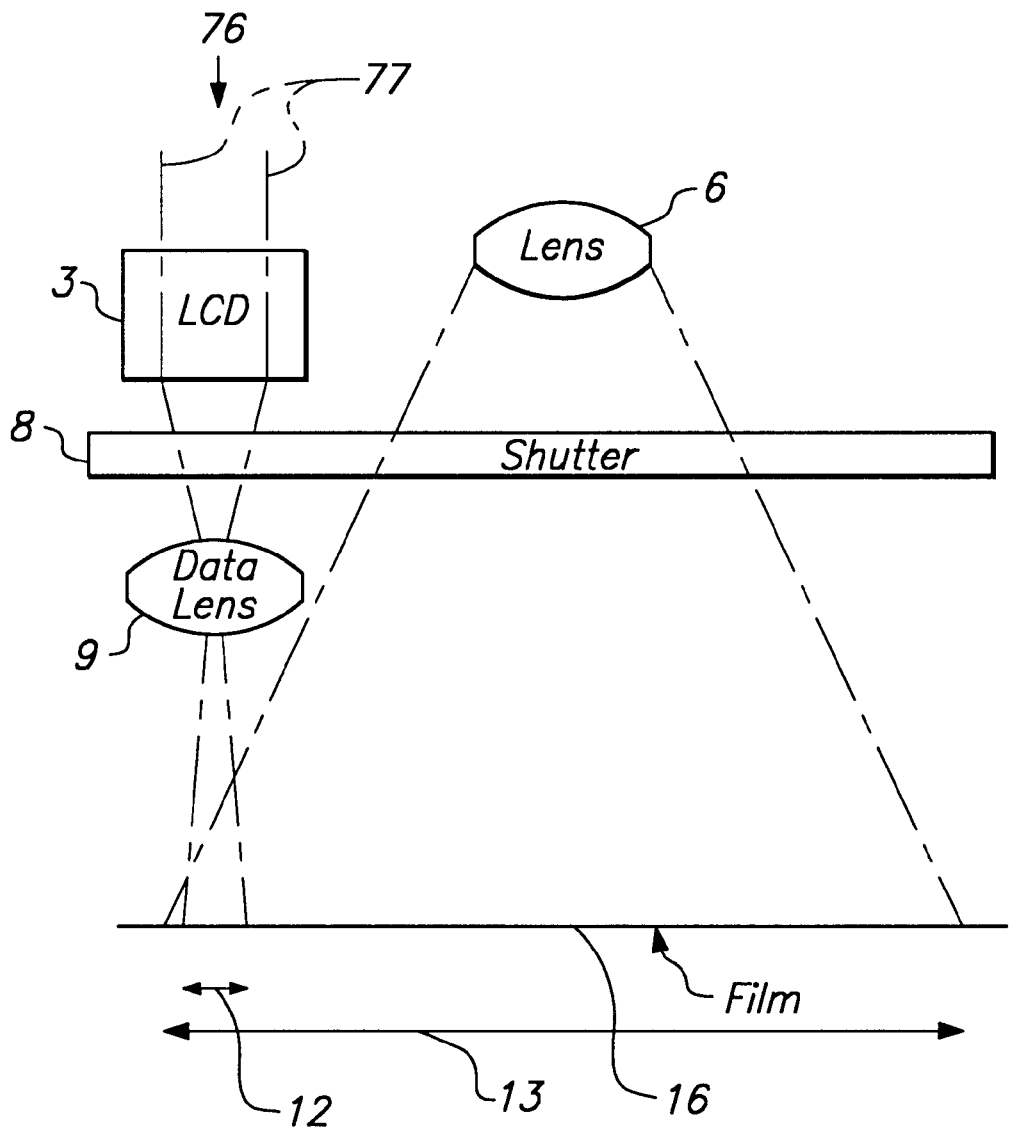
FIG. 18 is a schematic diagram of a camera including a conventional ambient light data-projection device.

FIG. 16 shows disposable camera 67 is wrapped inside package 68. Normally, disposable cameras are sold wrapped in this kind of package. Area 69 corresponding to projection liquid crystal display device 3 of the disposable camera is transparent, making it possible to check projection liquid crystal display device 3 from outside. In this state, the projection data being displayed in the projection liquid crystal display device is inverted and cannot be easily verified. Therefore, an optical adapter for checking is used to make accurate checking easier. FIG. 17 is a cross-section diagram in which this adapter is attached to the disposable camera package. Adapter 70 is provided with half mirror 71.

Light 74 that enters adapter 70 passes through half mirror 71 and projection liquid crystal display device 3, and is then reflected by reflection plate 72 which is on the surface of shutter 8 on the back side of projection liquid crystal display device 3. Light 75 which has been reflected by the reflection plate passes through projection liquid crystal display device 3, and is reflected by half mirror 71, and then the data is magnified by magnification lens 73. If viewed from the side of magnification lens 73, the display data is inverted by half mirror 71 and is magnified, enabling the user to easily check the data through adapter 70. The adapter can also be used even after the package has been removed and the disposable camera is already being used. Note however that this technique cannot be used if the condensing lens has a Fresnel shape, making it impossible to check the panel display through the lens.

It would also be possible to make only the area of the package corresponding to the projection liquid crystal display device openable/closable, so that the package can be opened for attaching an adapter for checking and be closed after checking.

Because a dedicated noise battery circuit is embedded therein, the data-projection device according to the preferred embodiment can provide high reliability without the need for a monitoring device.

Furthermore, the battery terminal is extended over the entire device surface, one of the circuit board surfaces is covered with an anti-electrostatic copper foil pattern which is connected to the battery, thus providing an active electrostatic shield with the battery terminal and the copper foil pattern. Moreover, spring area is provided within the battery terminal and is fastened as the receiving area for the guide frame of the main body of the disposable camera to absorb impacts. Further, a dedicated backup capacitor is installed to provide backup in the event the battery contacts are separated from the battery by the impact of a fall, etc., preventing external noise from sources such as static electricity and strobe, or falling impact from causing a display error. Therefore a data-projection device with higher reliability can be provided without the need for a monitoring device.

Additionally, according to the above-described preferred embodiment of the invention, the clock counter data is constantly being compared with the preset data (value equaling the clock counter data present at the time of reset), and when the two pieces of data match each other, a reset is judged to have occurred and the display of the data-projection device is blanked out. Therefore incorrect data will not be projected even if reset occurs.

Moreover, according to the preferred embodiment of the invention, a terminal hole for data confirmation is provided in the main body of the disposable camera, and data can be confirmed and reset by connecting an external data setting/confirmation device, without the need to install a monitoring device or an on board correction device. The area of the disposable camera package that covers of the projection liquid crystal display device can be made transparent, a reflection sheet may be placed on the surface of the shutter positioned on the back of the projection liquid crystal display device, so the data reflected on the reflective surface of the shutter can be checked through the package surface; and the display can be checked by adding an adapter that reverts the inverted data back to a normal display state. Therefore, data can be checked easily without the need to add a dedicated monitoring device affixed to the data-projection device.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data-projection device for a camera without a monitor display, comprising:

a liquid crystal display for filtering ambient light received at an ambient light intake area of the camera and for projecting the filtered ambient light onto a frame of photographic film within the camera;

a circuit board defining opposing first and second major surfaces and an opening therebetween for positioning said liquid crystal display, said circuit board including a plurality of electrical components populating the second major surface thereof;

a panel frame securing said circuit board and including a planar surface disposed substantially parallel to and opposing the second major surface of said circuit board;

a battery terminal disposed on and substantially covering said planar surface of said panel frame; and a battery disposed on said panel frame and electrically coupled to said battery terminal for reducing noise and electrostatic damage to said electrical components of said circuit board.

2. The data-projection device of claim 1, further comprising a conductive material substantially covering the first major surface of said circuit board and in electrical communication with said battery.

3. The data-projection device of claim 2, wherein said conductive material comprises copper foil patterned on the first major surface of said circuit board.

4. The data-projection device of claim 1, wherein said plurality of electrical components includes a clock/calendar integrated circuit electrically communicating with an LCD driver for driving said liquid crystal display; and wherein said circuit board includes a plurality of terminals electrically coupled to said clock/calendar circuit for accessing at least one of calendar data, time data, and timing control information.

5. The data-projection device of claim 4, wherein access of calendar and time data is performed through serial communication across said plurality of circuit board terminals.

6. The data-projection device of claim 1, wherein said battery terminal includes a spring portion electrically communicating with said battery to absorb shocks and prevent electrical disruption between said battery terminal and said battery when the data-projection device endures an impact.

7. The data-projection device of claim 1, wherein said plurality of electrical components comprises a capacitor electrically communicating with said battery to at least temporarily retain a voltage on said battery terminal if electrical disruption between said battery and said battery terminal occurs.

8. A camera without a monitor display, comprising:

a housing accommodating at least one frame of photographic film and defining an ambient light intake area of a surface thereof; and a data-projection device secured within said housing and optically interposing the ambient light intake area and the frame of photographic film, comprising:

a liquid crystal display for filtering ambient light received at the ambient light intake area of the camera and for projecting the filtered ambient light onto a frame of photographic film within the camera;

a circuit board defining opposing first and second major surfaces and an opening therebetween for positioning said liquid crystal display, said circuit board including a plurality of electrical components populating the second major surface thereof;

a panel frame securing said circuit board and including a planar surface disposed substantially parallel to and opposing the second major surface of said circuit board;

a battery terminal disposed on and substantially covering said planar surface of said panel frame; and a battery disposed on said panel frame and electrically coupled to said battery terminal for reducing noise and electrostatic damage to said electrical components of said circuit board.

9. The camera of claim 8, further comprising a conductive material substantially covering the first major surface of said circuit board and in electrical communication with said battery.

10. The camera of claim 9, wherein said conductive material comprises copper foil patterned on the first major surface of said circuit board.

11. The camera of claim 9, wherein said plurality of electrical components includes a clock/calendar integrated circuit electrically communicating with an LCD driver for driving said liquid crystal display; and wherein said circuit board includes a plurality of terminals electrically coupled to said clock/calendar circuit for accessing at least one of calendar data, time data, and timing control information.

12. The camera of claim 11, wherein access of calendar and time data is performed through serial communication across said plurality of circuit board terminals.

13. The camera of claim 11, wherein said housing comprises a hole adjacent said circuit board terminals for external access thereof by a data setting/confirmation device communicating with the camera.

14. The camera of claim 8, wherein said battery terminal includes a spring portion electrically communicating with said battery to absorb shocks and prevent electrical disruption between said battery terminal and said battery when the data-projection device endures an impact.

15. The camera of claim 8, wherein said plurality of electrical components comprises a capacitor electrically communicating with said battery to at least temporarily retain a voltage on said battery terminal if electrical disruption between said battery and said battery terminal occurs.

16. The camera of claim 8, further comprising a data confirmation means optically communicating with the ambient light intake area to verify data to be projected by said liquid crystal display.

17. The camera of claim 16, wherein said data confirmation means includes an optical inverter to ease readability of the data to be projected by said liquid crystal display.

18. The camera of claim 16, further comprising a package substantially circumscribing said housing, said package including a translucent portion proximate the ambient light intake area thereby defining an optical path between said data confirmation means and the ambient light intake area.

19. A data imprinting device without a monitor display, comprising a liquid crystal display arranged about midway through an optical path extending from an ambient light intake to a photographic film, a liquid crystal display drive unit for causing a data pattern that will be imprinted onto the photographic film, said liquid crystal display drive unit being formed as a light transmitting part in said liquid crystal display and a shutter unit which opens and closes the optical path in conjunction with a photo-shooting shutter, wherein said data imprinting device imprints a data image corresponding to the data pattern by using ambient light that is taken in at said ambient light intake, and a built-in battery which is included for the data imprinting device use only.

20. The data imprinting device of claim 19, wherein one surface of said data imprinting device is covered with a pattern of copper film, and said pattern is connected to said battery.

21. The data imprinting device of claim 19, wherein date and time data is written in and read out of said data imprinting device through serial communication.

22. The data imprinting device of claim 19, further comprising a battery terminal which includes a spring portion for absorbing shock.

23. The data imprinting device of claim 19, further comprising a battery terminal and a capacitor for backup use only if said battery and said battery terminal are temporarily disconnected from each other.

24. The data imprinting device of claim 19, further comprising a battery terminal which covers at least one side of one surface of said data imprinting device.

25. A lens assembly including a data imprinting device without a monitor display, comprising a liquid crystal display arranged about midway through an optical path extending from an ambient light intake to a photographic film, a liquid crystal display drive unit for causing a data pattern that will be imprinted onto the photographic film, said liquid crystal display drive unit being formed as a light transmitting part in said liquid crystal display and a shutter unit which opens and closes the optical path in conjunction with a photo-shooting shutter, wherein said data imprinting device imprints a data image corresponding to the data pattern by using ambient light that is taken in at said ambient light intake, and a built-in battery which is included for the data imprinting device use only.

26. The lens assembly of claim 25, wherein one surface of said data imprinting device is covered with a pattern of copper film, and said pattern is connected to said battery.

27. The lens assembly of claim 25, wherein data and time data is written in and read out of said data imprinting device through serial communication.

28. The lens assembly of claim 25, further comprising a battery terminal which includes a spring portion for absorbing shock.

29. The lens assembly of claim 25, further comprising a battery terminal and a capacitor for backup use only if said battery and said battery terminal are temporarily disconnected from each other.

30. The lens assembly of claim 25, further comprising a battery terminal which covers at least one side of one surface of said data imprinting device.

31. The lens assembly of claim 29, wherein a terminal hole is provided on a main body of the lens assembly for setting and confirming data, and data to be imprinted in said data imprinting device can be set and confirmed by connecting a data setting and confirmation device to said terminal hole.

32. The lens assembly of claim 25, wherein data to be imprinted can be confirmed by arranging a detachable adapter for data confirmation in front of said liquid crystal display.

\* \* \* \* \*